US010551009B2

(12) United States Patent
Blusseau (10) Patent No.: US 10,551,009 B2
(45) Date of Patent: Feb. 4, 2020

(54) LIGHTING MODULE COMPRISING AT LEAST ONE REMOVABLE LIGHT SOURCE

(71) Applicant: VALEO VISION, Bobigny (FR)

(72) Inventor: Eric Blusseau, Bobigny (FR)

(73) Assignee: VALEO VISION, Bobigny (FR)

( * ) Notice: Subject to any disclaimer, the term of this patent is extended or adjusted under 35 U.S.C. 154(b) by 150 days.

(21) Appl. No.: 15/679,215

(22) Filed: Aug. 17, 2017

(65) Prior Publication Data

US 2018/0058639 A1   Mar. 1, 2018

(30) Foreign Application Priority Data

Aug. 30, 2016   (FR) ...................................... 16 58032

(51) Int. Cl.
| | |
|---|---|
| *F21K 9/60* | (2016.01) |
| *B60Q 1/26* | (2006.01) |
| *F21S 41/147* | (2018.01) |
| *B60Q 1/00* | (2006.01) |
| *F21S 41/19* | (2018.01) |
| *F21S 41/141* | (2018.01) |

(Continued)

(52) U.S. Cl.
CPC .............. *F21K 9/60* (2016.08); *B60Q 1/0064* (2013.01); *B60Q 1/2696* (2013.01); *F21S 2/005* (2013.01); *F21S 41/141* (2018.01); *F21S 41/147* (2018.01); *F21S 41/19* (2018.01); *B60Q 1/00* (2013.01); *F21S 41/24* (2018.01); *F21S 41/39* (2018.01); *F21S 43/20* (2018.01); *F21V 19/04* (2013.01); *F21Y 2115/10* (2016.08); *F21Y 2115/15* (2016.08); *G02B 6/0001* (2013.01)

(58) Field of Classification Search
CPC ......... F21S 41/19; F21S 41/147; F21V 19/04; B60Q 1/0064
See application file for complete search history.

(56) References Cited

U.S. PATENT DOCUMENTS 7,988,336 B1   8/2011  Harbers et al.
9,752,744 B2 *  9/2017  Muller ................... F21S 41/192
(Continued)

FOREIGN PATENT DOCUMENTS

EP   2 706 292 A1   3/2014
EP   2 915 698 A1   9/2015
(Continued)

OTHER PUBLICATIONS

French Preliminary Search Report dated May 10, 2017 in French Application 16 58032, filed on Aug. 30, 2016 (with English Translation of Categories of cited documents).

*Primary Examiner* — William N Harris
(74) *Attorney, Agent, or Firm* — Oblon, McClelland, Maier & Neustadt, L.L.P.

(57) ABSTRACT

Lighting module for a motor vehicle including an optical means that is fixedly mounted in the lighting module, the optical means having a base with a first housing. A carrier of the optical means, which is translationally movable with respect to the optical means, has a base with a second housing. The carrier of the optical means is able to take a locked position in which at least one light source is held partially in the first housing and partially in the second housing, an unlocked position in which the at least one light source may be removed from the lighting module, and at least one removable light source being removable having light-emitting means.

18 Claims, 6 Drawing Sheets

(51) Int. Cl.
*F21S 2/00* (2016.01)
*F21S 41/39* (2018.01)
*F21Y 115/10* (2016.01)
*F21Y 115/15* (2016.01)
*F21S 41/24* (2018.01)
*F21S 43/20* (2018.01)
*F21V 19/04* (2006.01)
*F21V 8/00* (2006.01)

(56) References Cited

U.S. PATENT DOCUMENTS

| | | | |
|---|---|---|---|
| 2006/0044840 A1* | 3/2006 | Watanabe | F21V 19/001 |
| | | | 362/647 |
| 2007/0109806 A1* | 5/2007 | Tsukamoto | F21S 41/147 |
| | | | 362/545 |
| 2011/0136394 A1* | 6/2011 | Mostoller | F21K 9/00 |
| | | | 439/701 |
| 2011/0267822 A1 | 11/2011 | Harbers et al. | |
| 2011/0280034 A1* | 11/2011 | Tsukamoto | F21S 43/19 |
| | | | 362/544 |
| 2013/0021808 A1 | 1/2013 | Harbers et al. | |
| 2014/0268834 A1 | 9/2014 | Zanotto et al. | |
| 2015/0252973 A1 | 9/2015 | Muller et al. | |
| 2015/0266407 A1 | 9/2015 | Rubia Mena et al. | |

FOREIGN PATENT DOCUMENTS

| | | |
|---|---|---|
| EP | 2 921 770 A2 | 9/2015 |
| JP | 2011-119168 | 6/2011 |
| WO | WO 2013/053625 A2 | 4/2013 |

* cited by examiner

LIGHTING MODULE COMPRISING AT LEAST ONE REMOVABLE LIGHT SOURCE

TECHNICAL FIELD OF THE INVENTION

The present invention relates to a lighting module for a motor vehicle. It has a particular but nonlimiting application in lighting devices such as motor vehicle headlamps.

BACKGROUND OF THE INVENTION

A lighting module for a motor vehicle comprises, as known to those skilled in the art:
   an optical means;
   a carrier of the optical means;
   at least one light source housed in the lighting module.
The light source comprises:
   light-emitting means;
   a mechanical carrier of the light-emitting means.
The lifetime of a light source such as a semiconductor emitting chip is generally longer than 3000 hours of operation. In case of malfunction, the question of replacement of this light source must then be addressed. In order to replace a defective light source, it is known practice to remove the entire lighting module, i.e. the optical means and the defective light source.

One drawback of this prior-art method is that replacing the entire lighting module leads to scrappage of elements, such as the optical means, which are not necessarily defective. The user must thus purchase a new complete lighting module each time a light source becomes defective, this making the operation of replacement of the lighting module more expensive.

In this context, the present invention aims to solve the aforementioned drawback.

GENERAL DESCRIPTION OF THE INVENTION

To this end, the invention proposes a lighting module for a motor vehicle, said lighting module comprising:
   an optical means that is fixedly mounted in the lighting module, said optical means comprising a base with a first housing;
   a carrier of the optical means, which is translationally movable with respect to the optical means, said carrier of the optical means comprising a base with a second housing, said carrier of the optical means being able to take:
      a locked position in which at least one light source is held partially in said first housing and partially in said second housing; and
      an unlocked position in which said at least one light source may be removed from the lighting module;
   said at least one light source being removable and comprising:
      light-emitting means;
      a mechanical carrier of the light-emitting means.
Thus, as will be seen in detail below, the removable light source is placed in a housing formed partially from a first housing belonging to the optical means and partially from a second housing belonging to the carrier of the optical means. The carrier of the optical means is translationally movable with respect to the optical means between a locked position and an unlocked position. In the unlocked position, the light source is accessible to an operator and it is then possible to remove the defective light source from the lighting module. Only the light source is then replaced, thereby decreasing the overall cost of this maintenance operation.

According to some nonlimiting embodiments, the lighting module may further comprise one or more additional features from among the following:

According to one nonlimiting embodiment, the carrier of the optical means is translationally movable in:
   a longitudinal direction; or
   a transverse direction that is perpendicular to the longitudinal direction; or
   an oblique direction having a component in the longitudinal direction and a component in the transverse direction.

According to one nonlimiting embodiment, said lighting module comprises locking means.

According to one nonlimiting embodiment, the locking means comprise two pairs of slides that are placed on either side of the light source.

According to one nonlimiting embodiment, each slide comprises:
   a counterpart belonging to the optical means;
   a lug belonging to the carrier of the optical means, which is able to interact with said counterpart;
   at least one leaf spring belonging to the optical means, which spring is suitable for holding the lug in the counterpart.

According to one nonlimiting embodiment, the light source is blocked in the first housing and the second housing when the carrier of the optical means is in the locked position:
   in the longitudinal direction at at least one primary reference point by means of at least one primary blocking means;
   in the transverse direction at at least one secondary reference point by means of at least one secondary blocking means.

According to one nonlimiting embodiment, the primary blocking means is a leaf spring or a chamfer.

According to one nonlimiting embodiment, the secondary blocking means is a chamfer or a leaf spring.

According to one nonlimiting embodiment, the light source is blocked in the first housing and the second housing when the carrier of the optical means is in the locked position following a translational movement in the longitudinal direction:
   in the longitudinal direction at two primary reference points by means of two primary blocking means of the base of the carrier of the optical means;
   in the transverse direction at one secondary reference point by means of a secondary blocking means.

According to one nonlimiting embodiment, the two primary blocking means and the secondary blocking means are leaf springs.

According to one nonlimiting embodiment, the light source is blocked in the first housing and the second housing when the carrier of the optical means is in the locked position following a translational movement in the transverse direction:
   in the longitudinal direction at a primary reference point by means of a primary blocking means of the base of the optical means;
   in the transverse direction at two secondary reference points by means of two secondary blocking means of the base of the carrier of the optical means.

According to one nonlimiting embodiment, the primary blocking means and the two secondary blocking means are chamfers.

According to one nonlimiting embodiment, the light source is blocked in the second housing in a normal direction at three tertiary reference points by means of three tertiary blocking means.

According to one nonlimiting embodiment, the three tertiary blocking means are three leaf springs belonging to the base of the carrier of the optical module.

According to one nonlimiting embodiment, said lighting module furthermore comprises wedging means for holding a power-supply connector of the light source in said lighting module.

According to one nonlimiting embodiment, the carrier of the optical means is a radiator.

According to one nonlimiting embodiment, the light-emitting means include a semiconductor emitting chip.

BRIEF DESCRIPTION OF THE FIGURES

The invention and the various applications thereof will be better understood on reading the following description and on examining the accompanying figures.

DESCRIPTION OF EMBODIMENTS OF THE INVENTION

Elements that are identical, in structure or in function, and that appear in various figures have been given, unless specified otherwise, the same references.

The motor-vehicle lighting module 10 according to the invention is described with reference to FIGS. 1 to 12.

By motor vehicle, what is meant is any type of motorized vehicle.

In one nonlimiting embodiment considered in the remainder of the description, the lighting module 10 belongs to a lighting and/or signaling device. In one nonlimiting variant, the lighting and/or signaling device is a motor-vehicle headlamp.

Figure 1:
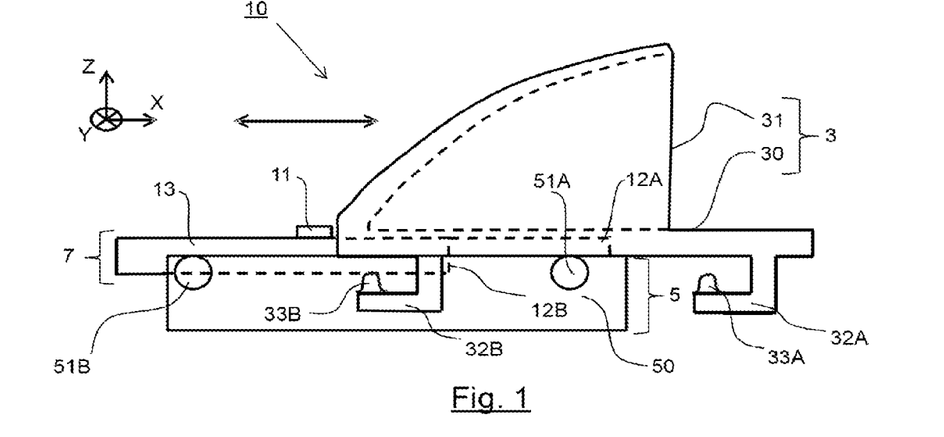
FIG. 1 schematically shows a side view of a motor-vehicle lighting module according to one nonlimiting embodiment of the invention, said lighting module comprising an optical means and a carrier of the optical means in an unlocked position in which a light source is accessible.
Figure 2:
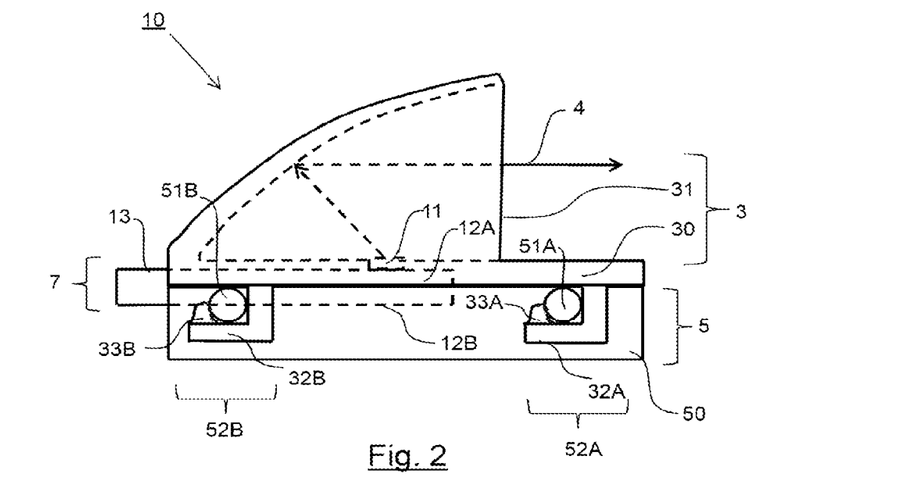
FIG. 2 schematically shows a side view of the lighting module of FIG. 1 according to one nonlimiting embodiment, said carrier of the optical means being in a locked position in which the light source is held in said lighting module.

As illustrated in FIGS. 1 and 2, the lighting module 10 comprises:
- an optical means 3 that is fixedly mounted in the lighting module 10. This optical means comprises a base 30 comprising a first housing 12A;
- a carrier 5 of the optical means 3, which is translationally movable with respect to the optical means 3 in:
  - a longitudinal direction X; or
  - a transverse direction Y that is perpendicular to the longitudinal direction X; or
  - an oblique direction having a component in the longitudinal direction X and a component in the transverse direction Y. This carrier 5 of the optical means 3 comprises a base 50 comprising a second housing 12B. The carrier 5 of the optical means 3 is able to take:
    - a locked position in which at least one light source 7 is held partially in the first housing 12A and partially in the second housing 12B; and
    - an unlocked position in which the light source 7 may be removed from the lighting module 10.
- the light source 7 is removable and comprises:
  - light-emitting means 11;
  - a mechanical carrier 13 of the light-emitting means 11.

The lighting module 10 is able to emit light rays 4 forming a light beam. In one nonlimiting example, the lighting module 10 is able to provide what is called a "high-beam" photometric function, in order to provide maximum illumination. In another nonlimiting example, the lighting module 10 is able to provide what is called a "low-beam" photometric function, in order, for example, to prevent other road users from being dazzled.

The various elements of the lighting module 10 are described in detail below.

Optical Means

In one nonlimiting embodiment, the optical means 3 is:
- a reflector;
- a lens; or
- a light guide; or
- a collimator.

The optical means 3 interacts with the light source 7 described below to form light rays 4.

In the nonlimiting example illustrated in FIGS. 1, 2, 10 and 11, the optical means 3 is a reflector that comprises a mirror 31 and a base 30.

Light Source

Apart from the light-emitting means 11 and the mechanical carrier 13, the light source 7 comprises an electrical-connection interface 16.

The electrical-connection interface 16 allows the light-emitting means 11 to be supplied with electrical power and controlled.

The electrical-connection interface 16 is able to interact with an external electrical connector that allows control signals to be sent to the light source 7 and it to be powered.

The light source 7 is able to interact with the optical module 3. In one nonlimiting embodiment, the light source 7 comprises a plurality of light-emitting means 11. In the nonlimiting example illustrated in FIGS. 3, 4, 5, 6, 7 and 9, there are six light-emitting means.

In one nonlimiting embodiment, the light-emitting means 11 include at least one semiconductor emitting chip.

In one nonlimiting variant, the semiconductor emitting chips are constituents of light-emitting diodes. By light-emitting diodes, what is meant is any type of light-emitting diode, i.e., to give a number of nonlimiting examples, LEDs (light-emitting diodes), OLEDs (Organic LEDs), or AMO-LEDs (active-matrix organic LEDs) or even FOLEDs (flexible OLEDs).

The light source 7 is removable, namely it may be removed from the lighting module 10 without removing the optical module 3 from said lighting module 10. The light source 7 is thus interchangeable.

Carrier of the Optical Means

In one nonlimiting embodiment, the carrier 5 of the optical means 3 is a radiator that allows the heat originating from the light source 7 to be removed from the lighting module 10.

The carrier 5 of the optical means 3 is translationally movable with respect to the optical means 3 and it is its movement between the locked position and the unlocked position that will allow the light source 7 to be removed from the lighting module 10.

In one nonlimiting embodiment, it is the user that ensures the translational movement of the carrier 5 of the optical means 3 between the unlocked position and the locked position. In the unlocked position, the light source 7 may be removed from the lighting module 10. In the locked position, the optical means 3 and the carrier 5 of the optical means 3 are mechanically connected by the locking means 52A, 52B, 52A', 52B' so as to ensure the carrier of the optical means 3 is locked with respect to said optical means 3 and the light source 7 is blocked in the lighting module 10.

Figure 12:
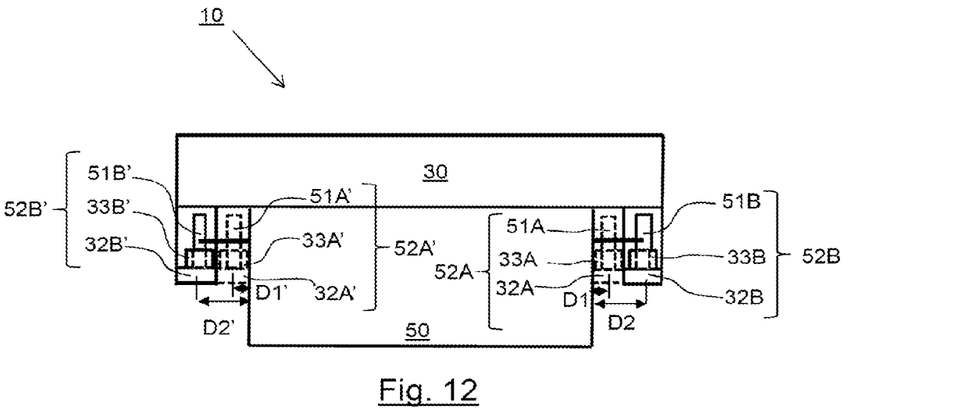
FIG. 12 shows, according to one nonlimiting embodiment, a rear view of the lighting module of FIG. 2, said lighting module comprising two pairs of slides that are placed on either side of the light source.

In one nonlimiting embodiment such as illustrated in FIG. 12, the locking means comprise two pairs of slides 52A, 52B, 52A', 52B' that are placed on either side of the light source 7. These pairs of slides are able to stably lock, on each side of the light source 7, the carrier 5 of the optical means 3 with respect to the optical means 3. The slides are relatively spaced apart with respect to the base 50 of the carrier 5 of the optical means 3.

In one nonlimiting embodiment, each slide 52A, 52B, 52A', 52B' respectively comprises:
- a counterpart 32A, 32B, 32A', 32B' belonging to the optical means 3;
- a lug 51A, 51B, 51A', 51B' belonging to the carrier 5 of the optical means 3, which is able to interact with said counterpart 32A, 32B, 32A', 32B', respectively;
- at least one leaf spring 33A, 33B, 33A', 33B' belonging to the optical means 3, which spring is suitable for holding the lug 51A, 51B, 51A', 51B' in the counterpart 32A, 32B, 32A', 32B', respectively.

The side view of the lighting module 10 of FIG. 1 shows the counterparts 32A, 32B, the lug 51B, and the two leaf springs 33A, 33B.

Such as illustrated in FIG. 12, the counterparts 32A, 32A' located at the front of the lighting module 10 have a distance D1, D1' smaller than the distance D2, D2' of the counterparts 32B, 32B' located at the back of the lighting module. During the translational movement of the carrier 5 of the optical means 3 with respect to the optical means 3, the lugs 51A, 51A' pass between the counterparts 32B, 32B' before being blocked by the counterparts 32A, 32A'.

Thus, each counterpart of the optical means 3 is able to block translationally the corresponding lug of the carrier of the optical means 3. Each leaf spring ensures the corresponding lug is held blocked against a corresponding counterpart, in the locked position of the carrier of the optical means 3.

In the locked position of the carrier 5 of the optical means 3, i.e. the position such as shown in FIG. 2:
- the optical means 3 and the carrier 5 of the optical means 3 make contact. More particularly, the base 30 of the optical means 3 and the base 50 of the carrier 5 of the optical means 3 make contact;
- the first housing 12A and the second housing 12B are directly opposite each other;
- the light source 7 is blocked in the lighting module 10. More particularly, the mechanical carrier 13 of the light-emitting means 11 is:
  blocked horizontally in the first housing 12A of the optical means 3 and in the second housing 12B of the carrier 5 of the optical means 3;
  blocked vertically by the optical means 3 against the carrier 5 of said optical means 3.

The light source 7 is thus held in position in the optical module 3. In this way, the light-emitting means 11 of the light source 7 are positioned and blocked in a focal zone F of the optical means 3. This makes it possible to obtain a good focus on the optical module 3 and thus to optimize the light beam.

It will be noted that there is a thermal interface (not illustrated) between the mechanical carrier 13 and the carrier 5 of the optical means 3. This thermal interface makes it possible to ensure the heat is conducted between the mechanical carrier 13 and the light source 7.

In one nonlimiting embodiment, the light source 7 is blocked in the second housing 12B and in the first housing 12A when the carrier 5 of the optical means 3 is in the locked position:
- in a longitudinal direction X at at least one primary reference point 9A, 9B, 9C (described below) by means of at least one primary blocking means 14A, 14B, 26 (described below) of the base 30 of the optical means 3 or of the base 50 of the carrier of the optical means 5;
- in a transverse direction Y, which is perpendicular to the longitudinal direction X, at at least one secondary reference point 15A, 15B, 15C (described below) by means of at least one secondary blocking means 18A, 18B, 19 (described below) of the base 30 of the optical means 3 or of the base 50 of the carrier of the optical means 5.

In one nonlimiting embodiment, the primary blocking means is a leaf spring 14A, 14B.

In another nonlimiting embodiment, the primary blocking means is a chamfer 26.

In one nonlimiting embodiment, the secondary blocking means is a chamfer 18A, 18B or a leaf spring 19.

In one nonlimiting embodiment, the light source 7 is blocked in the first housing 12A and the second housing 12B when the carrier 5 of the optical means 3 is in the locked position, in a normal direction Z, at tertiary reference points 25A, 25B, 25C, against which the carrier 5 of the optical module 3 (in particular its base 50) bears when the carrier 5 of the optical module 3 is in the locked position.

Figure 9:
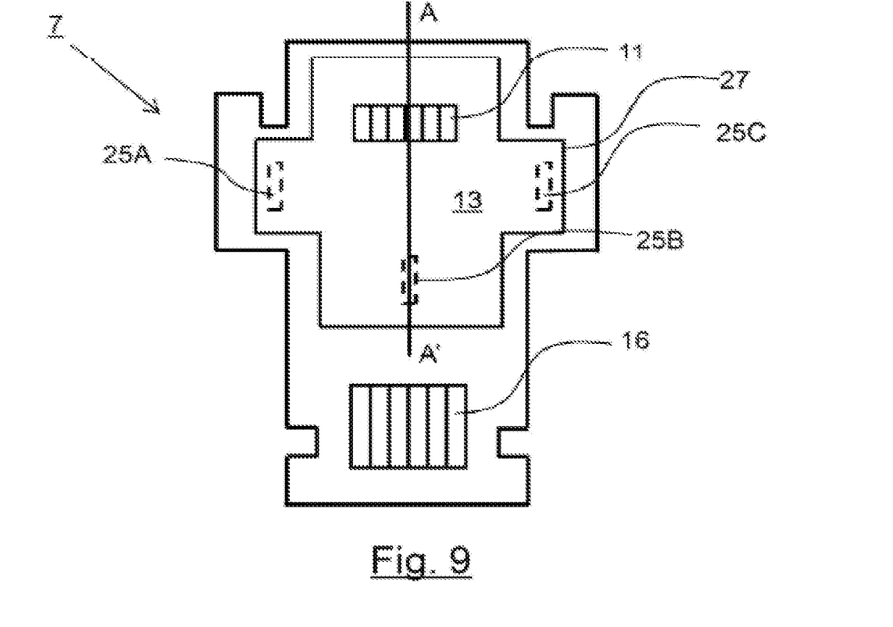
FIGS. 9 and 10 show, according to one nonlimiting embodiment, the light source when it is held in the lighting module of FIG. 2 in a normal direction Z.

In one nonlimiting embodiment illustrated in FIG. 9, the light source 7 comprises three tertiary reference points 25A, 25B, 25C that are able to interact with three tertiary blocking means 17A, 17B and 17C, to block the mechanical carrier 13 of the light source 7 against the bottom of the first housing 12A in the normal direction Z.

It will be noted that in FIG. 9, the three tertiary reference points 25A, 25B, 25C have been drawn with dashed lines because they are positioned on the face of the mechanical carrier 13 which is opposite the face on which the light-emitting means 11 and the electrical-connection interface 16 are positioned.

Figure 10:
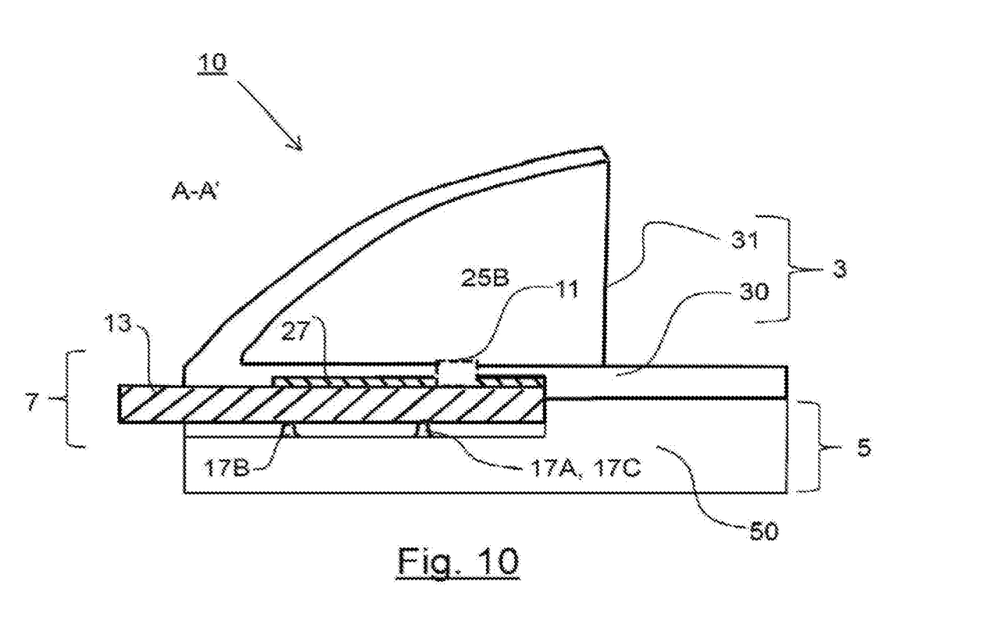
Figure 11:
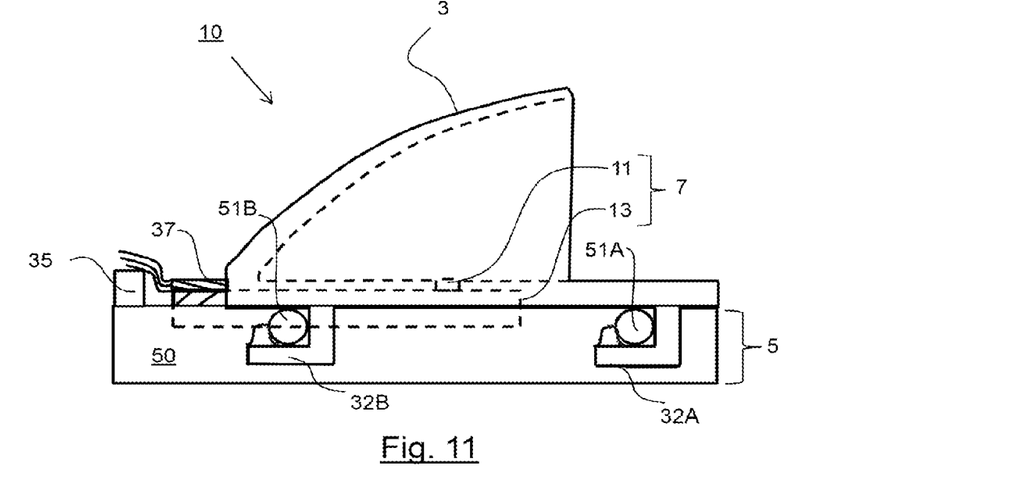
FIG. 11 shows, according to one nonlimiting embodiment, a cross-sectional view of the lighting module of FIG. 2, said lighting module comprising wedging means for holding a power-supply connector of the light source in said lighting module.

In one nonlimiting embodiment illustrated in FIG. 10, the tertiary blocking means are three leaf springs 17A, 17B, 17C placed on the base 50 of the carrier 5 of the optical means 3. These leaf springs 17A, 17B, 17C are gradually placed under tension as the carrier 5 of the optical means 3 is moved translationally with respect to the optical means 3. The leaf springs 17A, 17B, 17C bear against the mechanical carrier 13 of the light-emitting means 11 so that, in the locked position, the carrier 5 of the optical means 3 holds the light source 7 in position in the normal direction Z. Thus, the mechanical carrier 13 bears against the base 30 of the optical means 3 in the normal direction Z.

The base 50 thus allows the isostatism in Z of the light source 7 to be managed via the tertiary reference points 25A, 25B, 25C.

In one nonlimiting embodiment, such as illustrated in FIG. 9, the light source 7 furthermore includes a protective cover 27. The protective cover 27 comprises an aperture in order to let the light emitted by the light source 7 pass. By virtue of the leaf springs 17A, 17B, 17C, the protective cover 27 is made to bear against the base 30 of the optical means 3 when the carrier 5 of the optical means 3 is in the locked position.

In the unlocked position of the carrier 5 of the optical means 3, i.e. the position such as shown in FIG. 1:
 the optical means 3 and the carrier 5 of the optical means 3 are a distance apart from each other so as to allow the light source 7 to be removed. It will be noted that in this case the base 30 of the optical means 3 and the base 50 of the carrier 5 of the optical means 3 may be in contact or not;
 the first housing 12A and the second housing 12B are a distance apart from each other, i.e. they are no longer directly opposite;
 the light source 7 remains blocked in the second housing 12B but is accessible and may be removed from the lighting module 10.

The lighting module 10 of FIGS. 1 and 2 is described below by way of three nonlimiting embodiments.

First Embodiment

The lighting module 10 comprises the optical means 3, the carrier 5 of the optical means 3 and the light source which were described above. In this first embodiment, the carrier 5 of the optical means 3 is translationally movable with respect to the optical means 3 in the longitudinal direction X.

Figure 3:
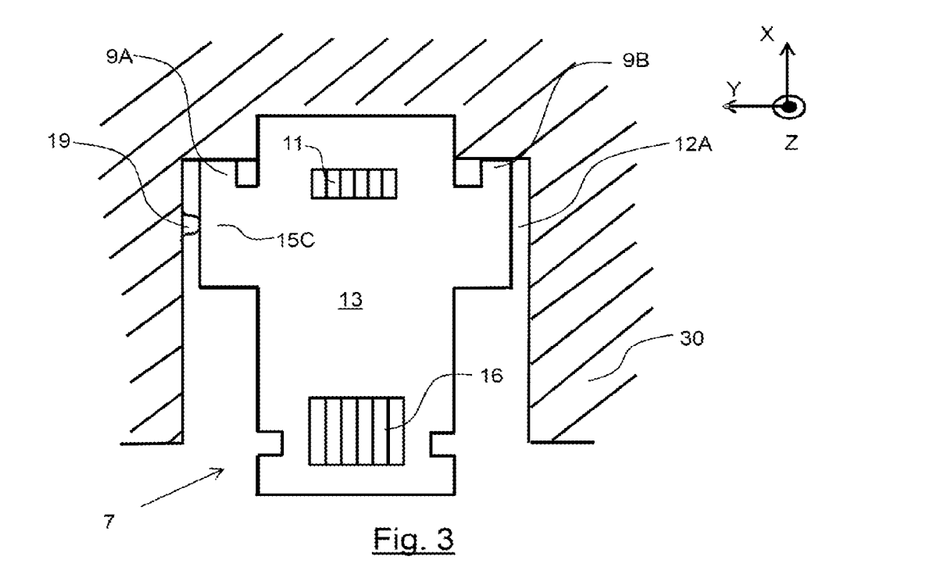
FIGS. 3 and 4 show a top view of the light source when it is held partially in a first housing of the optical means and when it is held partially in a second housing of the carrier of the optical means of the lighting module of FIG. 2, in a longitudinal direction X and in a transverse direction Y, following a translational movement of the carrier of the optical means in this longitudinal direction X, according to a first nonlimiting embodiment.
Figure 4:
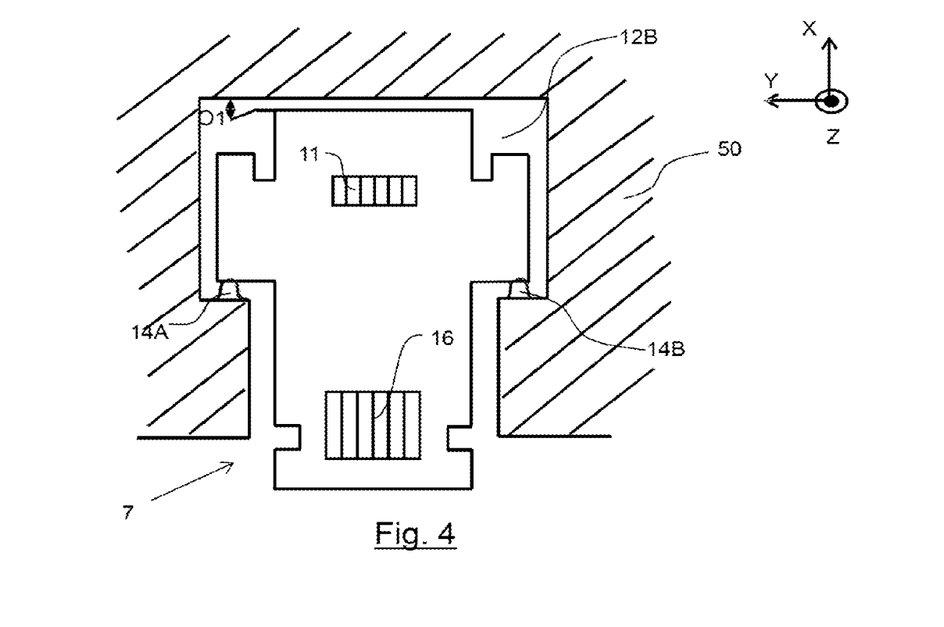

FIGS. 3 and 4 schematically show the base 30 of the optical means 3 and the base 50 of the carrier 5 of the optical means 3 of the lighting module 10, respectively, according to a first nonlimiting embodiment.

In one nonlimiting embodiment, the optical means 3 is a reflector.

The optical means 3 includes a base 30 and a mirror 31. The mirror 31 performs the optical functions of the optical means 3. The base 30 carries the mirror 31 and comprises a contact area intended to make contact with the base 50 of the carrier 5 of the optical means 3. This base 30 defines the first housing 12A of the optical means 3 illustrated in FIG. 3.

The mechanical carrier 13 of the light source 7 includes two arms that are able to form two primary reference points 9A, 9B.

When the carrier 5 of the optical means 3 is in the unlocked position, the light source 7 is positioned by the operator in the second housing 12B of the optical means 3, illustrated in FIG. 4.

In the unlocked position, two primary blocking means 14A, 14B make contact with the mechanical carrier 13 of the light source 7, and there is, such as illustrated in FIG. 4, play O1, in the longitudinal direction X, between the end of the mechanical carrier 13 on the side on which the light-emitting means 11 are located and the edge of the base 50 of the carrier 5. This allows the light source 7 to be pre-positioned in the housing 12B.

When the carrier 5 of the optical means 3 is pushed translationally in the longitudinal direction X into the optical means 3, the mechanical carrier 13 comes to be housed in the first housing 12A of the base 30 of the optical means 3, illustrated in FIG. 3.

When the lugs 516, 516', 51A, 51A' described above abut against the counterparts 32B, 32B', 32A, and 32A', respectively, the carrier 5 of the optical means 3 is then in the locked position.

As was mentioned above, it is the translational movement of the carrier 5 of the optical means 3, in the longitudinal direction X, that allows the first housing 12A and the second housing 12B to be placed directly opposite and the two bases 30 and 50 to be brought into contact.

When the carrier 5 of the optical means 3 is in the locked position, in the second housing 12B, the mechanical carrier 13 is blocked in the longitudinal direction X by two primary blocking means 14A, 14B of the base 50 of the carrier 5 of the optical means 3, which are illustrated in FIG. 4. These two primary blocking means 14A, 14B act on the mechanical carrier 13 of the light-emitting means 11, so that the two primary reference points 9A, 9B, which are illustrated in FIG. 3, abut against the internal wall of the housing 12A. The base 30 of the optical means 3 thus allows the isostatism in X of the light source 7 to be managed via the primary reference points 9A, 9B. At this stage, the two primary blocking means 14A, 14B are strained and the play O1 may vary (for example increase) when the light source 7 is blocked in the first housing 12A level with the two primary reference points 9A, 9B.

In one nonlimiting embodiment, the two primary blocking means 14A, 14B are two leaf springs. These two leaf springs allow the light source 7 to be easily maintained against the lighting module 10 in the longitudinal direction X.

When the carrier 5 of the optical means 3 is in the locked position, in the first housing 12A, the mechanical carrier 13 is blocked in the transverse direction Y by a secondary blocking means 19 illustrated in FIG. 3. The secondary blocking means 19 acts on the mechanical carrier 13 level with the secondary reference point 15C, illustrated in FIG. 3.

At this stage, there is no play between the end of the mechanical carrier 13 of the light source 7 and the edge of the base 30 of the optical means 3 such as illustrated in FIG. 3.

In one nonlimiting embodiment, the secondary blocking means 19 is a leaf spring. This leaf spring allows the light source 7 to be easily maintained against the lighting module 10 in the transverse direction Y.

In this first embodiment, to block the light source 7, this light source is first positioned in the second housing 12B of the carrier 5 of the optical means 3 and then in the first housing 12A of the optical means 3. By proceeding in this way, it is guaranteed that the light source 7 will be positioned with precision in the lighting module 10 and that it will remain stable in this position.

Second Embodiment

The lighting module 10 comprises the optical means 3, the carrier 5 of the optical means 3 and the light source which were described above. In this second embodiment, the carrier 5 of the optical means 3 is translationally movable with respect to the optical means 3 in the longitudinal direction Y.

Figure 5:
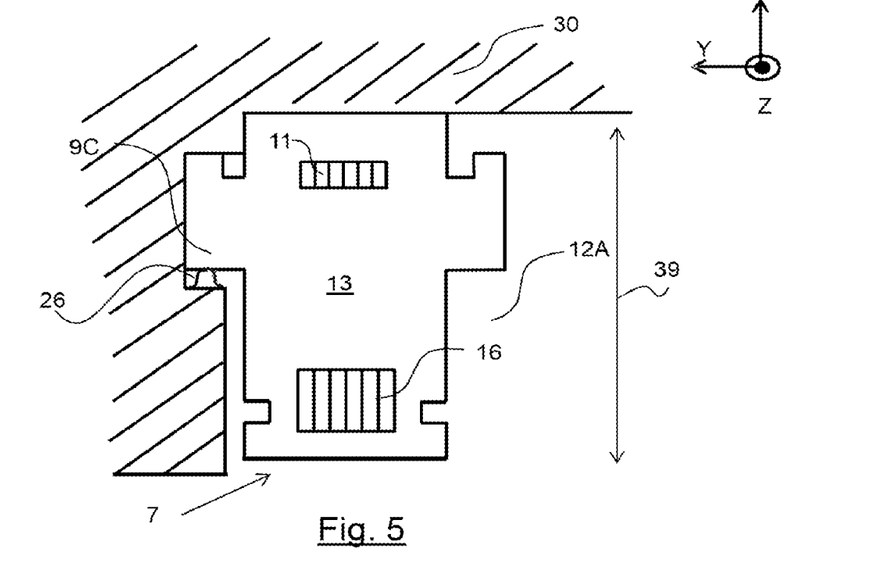
FIG. 5 shows a top view of the light source when it is held partially in the first housing of the optical means of the lighting module of FIG. 2, in the longitudinal direction X, following a translational movement of the carrier of the optical means in the transverse direction Y, according to a second nonlimiting embodiment.
Figure 6:
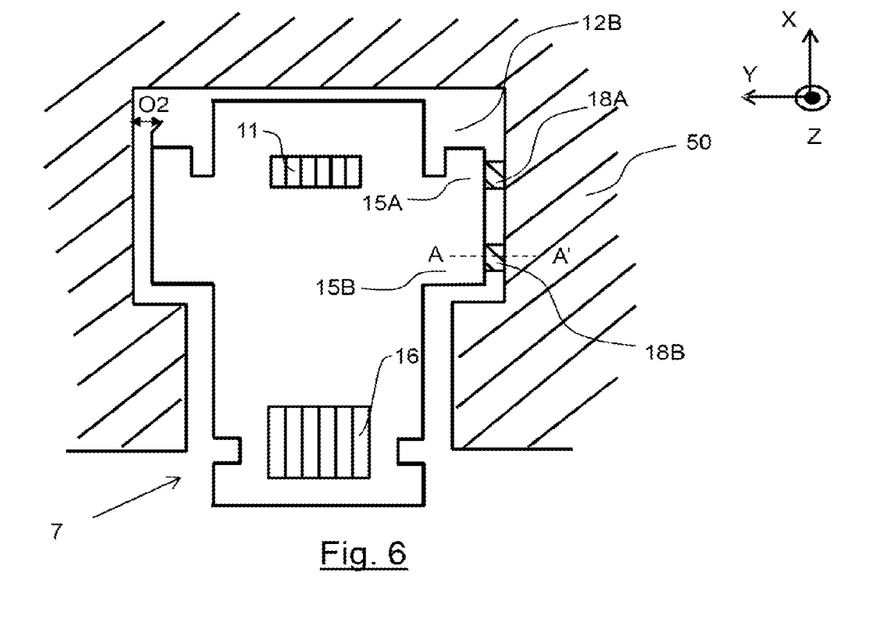
FIG. 6 shows a top view of the light source when it is held partially in the second housing of the carrier of the optical means of the lighting module of FIG. 2, in the transverse direction Y, following a translational movement of the carrier of the optical means in this transverse direction Y, according to a first variant of a second nonlimiting embodiment.
Figure 7:
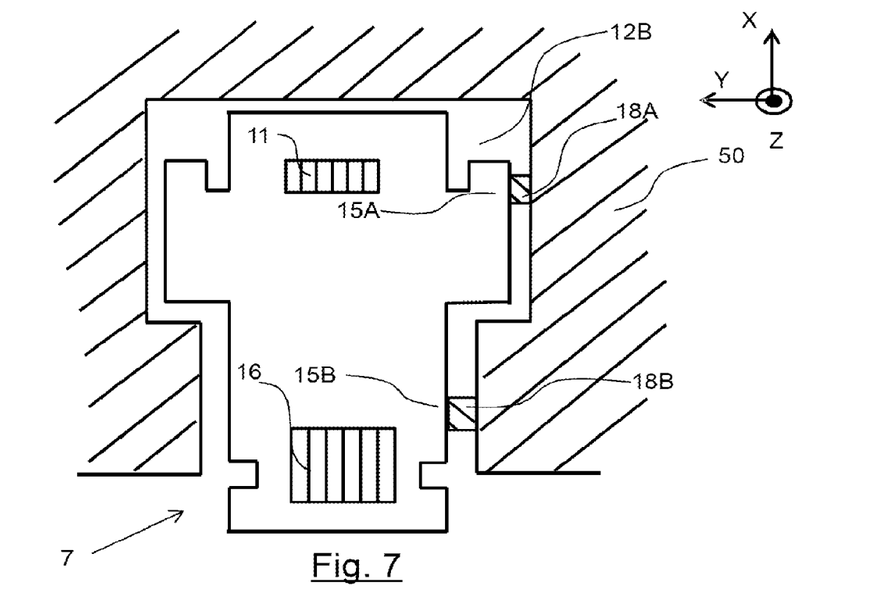
FIG. 7 shows a top view of the light source when it is held partially in the second housing of the carrier of the optical means of the lighting module of FIG. 2, in the transverse direction Y, following a translational movement of the carrier of the optical means in this transverse direction Y, according to a nonlimiting second variant of the second embodiment.

FIGS. 5, 6 and 7 schematically show the base 30 of the optical means 3 and the base 50 of the carrier 5 of the optical means 3 of the lighting module 10, respectively, according to a second nonlimiting embodiment.

In one nonlimiting example, the optical means 3 is a reflector. The optical means 3 includes a base 30 and a mirror 31. The mirror 31 performs the optical functions of the optical means 3. The base 30 carries the mirror 31 and comprises a contact area intended to make contact with the base 50 of the carrier 5 of the optical means 3. This base 30 defines the first housing 12A of the optical means 3 illustrated in FIG. 5.

The mechanical carrier 13 of the light source 7 includes two arms, one of which is able to form a primary reference point 9C (the left arm in the nonlimiting example illustrated in FIG. 5).

Thus, when the carrier 5 of the optical means 3 is in the unlocked position, the light source 7 is positioned by the operator in the second housing 12B of the carrier 5 of the optical means 3, as illustrated in FIG. 6.

In the unlocked position, two secondary blocking means 18A, 18B of the base 50 of the carrier 5 of the optical means 3 make contact with two secondary reference points 15A, 15B of the mechanical carrier 13 of the light source 7, and there is, in the longitudinal direction Y, such as illustrated in FIG. 6, play O2 between the arm of the mechanical carrier 13 opposite the two secondary reference points 15A, 15B and the edge of the base 50 of the carrier 5. This allows the light source 7 to be pre-pre-positioned in the housing 12B.

When the carrier 5 of the optical means 3 is pushed translationally in the transverse direction Y into the optical means 3, the mechanical carrier 13 also comes to be housed in the first housing 12A of the base 30 of the optical means 3, illustrated in FIG. 5.

When the lugs 516, 516', 51A, 51A' described above abut against the counterparts 32B, 32B', 32A, and 32A', respectively, the carrier 5 of the optical means 3 is then in the locked position.

The arrangement of the slides 52A, 52B, 52A', 52B' including these lugs and these counterparts is different from that defined in the first embodiment. They are placed such that they allow the light source 7 to be moved translationally in the transverse direction Y.

As was mentioned above, it is the translational movement of the carrier 5 of the optical means 3, in the transverse direction Y, that allows the first housing 12A and the second housing 12B to be placed directly opposite and the two bases 30 and 50 to be brought into contact.

Such as illustrated in FIG. 5, when the carrier 5 of the optical means 3 is in the locked position, the light source 7, and more particularly the mechanical carrier 13, is blocked in the first housing 12A in the longitudinal direction X at a primary reference point 9C by means of a primary blocking means 26 of the base 30 of the optical means 3.

The base 30 of the optical means 3 thus allows the isostatism in X of the light source 7 to be managed via the primary reference point 9C.

At this stage, there is no play between the end of the mechanical carrier 13 of the light source 7 (on the side on which the light-emitting means 11 is located) and the edge of the base 30 of the optical means 3 such as illustrated in FIG. 5, nor between the arm (left arm in FIG. 5) of the mechanical carrier 13 and the edge of the base 30 of the optical means such as illustrated in FIG. 5.

It will be noted that to allow the carrier 5 of the optical means 3 to be pushed translationally in the transverse direction Y, the base 30 of the optical means 3 includes an aperture 39 provided for this purpose (illustrated in FIG. 5).

In another illustrated nonlimiting embodiment, the primary blocking means 26 is a leaf spring. This leaf spring allows the light source 7 to be easily maintained against the lighting module 10 in the longitudinal direction X. In another nonlimiting embodiment (not illustrated), the primary blocking means 26 is a chamfer. The chamfer allows the light source 7 to guided and gradually blocked in the lighting module 10, in the longitudinal direction X.

Such as illustrated in FIG. 6, when the carrier 5 of the optical means 3 is in the locked position, the light source 7, and more particularly the mechanical carrier 13, is blocked in the transverse direction Y at two secondary reference points 15A, 15B by means of two secondary blocking means 18A, 18B of the base 50 of the carrier 5 of the optical means 3. At this stage, the two secondary blocking means 18A, 18B are strained and the play O2 may vary (for example increase) when the light source 7 is blocked in the first housing 12A level with the primary reference point 9C.

In one nonlimiting embodiment (not illustrated), the two secondary blocking means 18A, 18B are leaf springs.

In another illustrated nonlimiting embodiment, the two secondary blocking means 18A, 18B are chamfers. The chamfers allows the light source 7 to be guided and gradually blocked in the lighting module 10, in the transverse direction Y.

Figure 8:
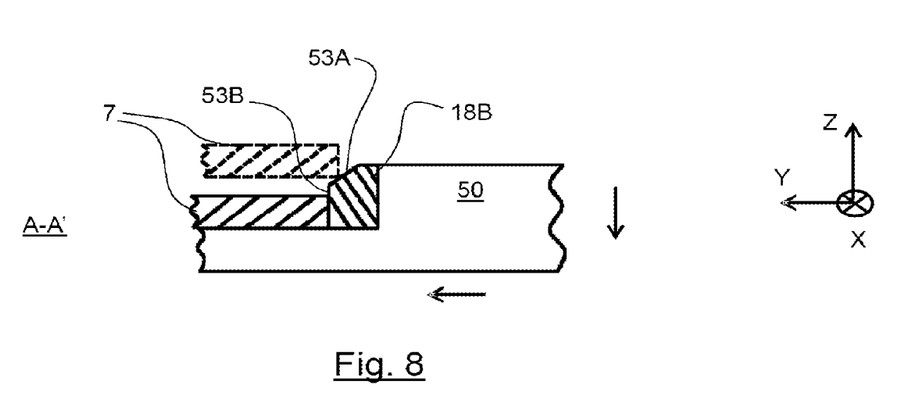
FIG. 8 is a cross-sectional view along the axis A-A' in FIG. 6, level with a means for blocking the light source in the second housing of the carrier of the optical means.

FIG. 8 is a cross-sectional view along A-A' in FIG. 6 level with the chamfer 18B. This chamfer 18 The comprises a beveled portion 53A and a straight portion 53B extending the beveled portion 53A. The beveled portion 53A is able to guide the light source 7 (which has been illustrated in dashed lines in an unblocked position) in the transverse direction Y and in the normal direction Z when said light source 7 is placed in the carrier 5 of the optical means 3, i.e. when this carrier 5 of the optical means 3 is in an unlocked position. The light source 7 thus gradually moves until its mechanical carrier 13 touches the bottom of the housing 12B. At this stage, the straight portion 53B blocks the light source 7

(which has been illustrated in solid lines) in the housing 12B of the carrier 5 of the optical means 3.

According to a first nonlimiting variant illustrated in FIG. 6, the two secondary blocking means 18A, 18B are close together and located at the front of the lighting module 10. When the carrier 5 of the optical means 3 is in a locked position, the two secondary blocking means 18A, 18B bear against an arm of the light source 7.

According to a second nonlimiting variant illustrated in FIG. 7, the spacing between the two secondary blocking means 18A and 18B is larger. The secondary blocking means 18B is thus located at the back of the lighting module 10. When the carrier 5 of the optical means 3 is in a locked position, the secondary blocking means 18A bears against an arm of the light source 7. The secondary blocking means 18B bears against the body of the light source 7.

In this way, the stability with which the mechanical carrier 13 is blocked in the transverse direction Y is improved.

It will be noted that for the chamfer 18A of FIG. 7 and the chamfer 26 of FIG. 5, the same gradual blocking principle as that described for the chamfer 18B in FIG. 8 applies. Thus, FIG. 8 applies to the chamfer 18A. Moreover, a similar figure to FIG. 8 applies to the chamfer 26 of FIG. 5, replacing the reference 50 with the reference 30.

As described above, the electrical-connection interface 16 of the light source 7 is able to interact with an external electrical connector 37 (illustrated in FIG. 11) of the light source 7. In order to prevent disconnection of this external electrical connector during use of the motor vehicle, in one nonlimiting embodiment illustrated in FIG. 12, the lighting module 10 furthermore comprises wedging means 35 for holding the external electrical connector 37 in the lighting module 10. The wedging means 35 belong to the base 50 of the carrier 5 of the optical means 3.

Of course, the description of the invention is not restricted to the embodiments described above.

Thus, in one nonlimiting embodiment, provision is made to deposit, on the internal walls of the second housing 12B, a conductive thermal foam or paste in order to promote the removal of the heat given off by the light-emitting means 11 to the carrier 5 of the optical means 3

Thus, in one nonlimiting embodiment, the carrier 5 of the optical means 3 may be moved translationally with respect to the optical module 3, according to the same described principle, in an oblique direction with a component in the longitudinal direction X and a component in the transverse direction Y.

Thus, the described invention in particular has the following advantages:
  replacement of a defective light source is easier;
  there is no need to remove the optical means 3 in order to perform the replacement operation;
  there is no need to scrap the entire optical means 3 just to replace one light source, thereby substantially decreasing the cost of replacing said light source;
  once the light source has been removed, it is possible to identify and change only the defective element of this light source 7;
  a system that is simple to manipulate is used to release the light source. It is enough for the operator to translate the carrier 5 of the optical means 3 with respect to said optical means 3; either in the longitudinal direction X, or in the transverse direction Y.

The invention claimed is:
1. A lighting module for a motor vehicle, the lighting module comprising:
  an optical component mounted in the lighting module, the optical component including a base with a first housing;
  a lock on either side of at least one light source; and
  a carrier, coupled to the optical component, translationally movable with respect to the optical component and including a base with a second housing, the carrier assuming,
    in a first instance, a locked position in which the at least one light source is held partially in the first housing and partially in the second housing, and
    in a second instance, an unlocked position in which the at least one light source is not held partially in the first housing and partially in the second housing and is removable from the lighting module,
  the removable at least one light source including
    a light-emitter, and
    a mechanical carrier of the light-emitter,
  wherein the lock includes at least one leaf spring mounted to the optical component, the at least one leaf spring being configured to hold a lug of the carrier in a counterpart of the optical component.

2. The lighting module according to claim 1, wherein the carrier is translationally movable in
  a longitudinal direction (X),
  a transverse direction (Y) that is perpendicular to the longitudinal direction (X), or
  an oblique direction having a component in the longitudinal direction (X) and a component in the transverse direction (Y).

3. Lighting The lighting module according to claim 1, wherein the lock includes
  the counterpart of the optical component, and
  the lug of the carrier.

4. The lighting module according to claim 2, wherein the at least one light source is blocked in the first housing and the second housing
  when the carrier is in the locked position in the longitudinal direction at at least one primary reference point by at least one primary blocker, and
  when the carrier is in the locked position in the transverse direction at at least one secondary reference point by at least one secondary blocker.

5. The lighting module according to claim 4, wherein the primary blocker is a leaf spring or a chamfer.

6. The lighting module according to claim 4, wherein the secondary blocker is a chamfer or a leaf spring.

7. The lighting module according to claim 4, wherein the at least one light source is blocked in the first housing and the second housing following a translation movement of the carrier in the longitudinal direction,
  the carrier is being in the locked position in the longitudinal direction at two primary reference points by two primary blockers of the base of the carrier, and
  the carrier being in the locked position in the transverse direction at one secondary reference point by a secondary blocker.

8. The lighting module according to claim 7, wherein the two primary blockers and the secondary blocker are leaf springs.

9. The lighting module according to claim 4, wherein the at least one light source is blocked in the first housing and the second housing following a translational movement of the carrier in the transverse direction,
  the carrier being in the locked position in the longitudinal direction (X) at a primary reference point by a primary blocker of the base of the optical component, and the carrier being in the locked position in the transverse direction (Y) at two secondary reference points by two secondary blockers of the base of the carrier.

10. The lighting module according to claim 9, wherein the primary blocker and the two secondary blockers are chamfers.

11. The lighting module according to claim 1, wherein the at least one light source is blocked in the second housing in a normal direction at three tertiary reference points by three tertiary blockers.

12. The lighting module according to claim 11, wherein the three tertiary blockers are three leaf springs mounted to the base of the carrier.

13. The lighting module according to claim 1, further comprising a holder for holding a power-supply connector of the at least one light source in a pre-determined position relative to the optical component within the lighting module.

14. The lighting module according to claim 1, wherein the carrier is a radiator.

15. The lighting module according to claim 1, wherein the light-emitter includes a semiconductor emitting chip.

16. The lighting module according to claim 2, wherein the at least one light source is blocked in the first housing and the second housing
when the carrier is in the locked position in the longitudinal direction (X) at at least one primary reference point by at least one primary blocker, and
when the carrier is in the locked position in the transverse direction (Y) at at least one secondary reference point by at least one secondary blocker.

17. The lighting module according to claim 5, wherein the secondary blocker is a chamfer or a leaf spring.

18. A lighting module for a motor vehicle, the lighting module comprising:
an optical means mounted in the lighting module and including a base with a first housing;
a locking means including two pairs of slides on either side of at least one light source; and
a carrier, coupled to the optical means, translationally movable with respect to the optical means and including a base with a second housing, the carrier assuming
in a first instance, a locked position in which the at least one light source is held partially in the first housing and partially in the second housing, and
in a second instance, an unlocked position in which the at least one light source is removable from the lighting module,
the at least one light source being removable and including
light-emitting means, and
a mechanical carrier of the light-emitting means,
wherein each slide of the locking means includes
a counterpart mounted to the optical means,
a lug mounted to the carrier and interactable with the counterpart, and
at least one leaf spring mounted to the optical means, the at least one leaf spring being configured to hold the lug in the counterpart.

* * * * *